United States Patent [19]

Edridge

[11] Patent Number: 4,688,259
[45] Date of Patent: Aug. 18, 1987

[54] RECONFIGURABLE MULTIPLEXER

[75] Inventor: Michael J. Edridge, Sunnyvale, Calif.

[73] Assignee: Ford Aerospace & Communications Corporation, Detroit, Mich.

[21] Appl. No.: 807,717

[22] Filed: Dec. 11, 1985

[51] Int. Cl.⁴ .............................................. H04B 7/185
[52] U.S. Cl. .................................. 455/12; 455/17; 455/25; 333/1.1
[58] Field of Search ................... 455/12, 17, 25, 132, 455/133; 333/24.1, 1.1, 126, 129, 132, 134, 136; 343/361

[56] References Cited

U.S. PATENT DOCUMENTS

| | | |
|---|---|---|
| 3,273,064 | 9/1966 | Künemund . |
| 3,422,438 | 1/1969 | Marston ................. 333/1.1 |
| 3,636,452 | 1/1972 | Nuding . |
| 3,646,467 | 2/1972 | Smith ..................... 333/1.1 |
| 3,696,421 | 10/1972 | Bitler ..................... 455/25 |
| 3,865,990 | 2/1975 | Küemund . |
| 4,039,947 | 8/1977 | Miedema ................. 455/17 |
| 4,041,389 | 8/1977 | Oades ..................... 455/17 |
| 4,109,202 | 8/1978 | Kudsia et al. . |
| 4,159,454 | 6/1979 | Willmore . |
| 4,161,694 | 7/1979 | Weber et al. . |
| 4,206,464 | 6/1980 | Hirsch . |

Primary Examiner—Jin F. Ng
Assistant Examiner—Elissa Seidenglanz
Attorney, Agent, or Firm—Edward J. Radlo; Keith L. Zerschling

[57] ABSTRACT

A dynamically reconfigurable multiplexer (7) has applicability in a space diversity communications system or a polarization reuse communications system. Multiplexer (7) may be situated on board a communications satellite or at the control nexus of a terrestrial microwave communications system. Multiplexer (7) comprises a set of N series-connected field reversible circulators (51). Coupled to one of the three ports of each circulator (51) is a channelizing filter (53), followed by an output isolator (54) and a high power amplifier (55). The electromagnetic energy rotating within each circulator (51) is commanded to move in either a clockwise or counterclockwise direction, depending upon whether it is desired to access the channel (52) corresponding to said circulator (51) via a first energy source (1) or second energy source (2). An input isolator (43, 44) associated with each antenna (1, 2) absorbs unwanted energy emanating from the opposing antenna (2, 1).

8 Claims, 4 Drawing Figures

RECONFIGURABLE MULTIPLEXER

DESCRIPTION

TECHNICAL FIELD

This invention pertains to the field of channelizing a frequency band of electromagnetic energy into a set of channels. The invention enables two input sources to share the same multiplexer, e.g., in a satellite communications system which features space diversity for frequency re-utilization.

FIG. 1 shows such a communications system, in which satellite 10 is positioned in geosynchronous orbit above the Atlantic Ocean. Satellite 10 has two antennas, 1 and 2, which are pointed towards New York City and London, respectively, and has a capacity of N transponder channels. N earth station antennas 62 are situated in greater New York and are oriented to propagate electromagnetic energy towards antenna 1. These N ground station antennas 62 can, for example, correspond to N channels within satellite 10, each of which has its own transponder for relaying radio messages. Similarly, N earth station antennas 72 are located in greater London and are oriented to propagate electromagnetic radiation towards antenna 2. At any given time, each one of the N satellite transponder channels can be accessed via either antenna 1 or 2, but not by both antennas. The present invention permits the separate allocation of the N individual satellite transponder channels using a single multiplexer 7 (instead of the two multiplexers used in conventional prior configurations). This allocation, achieved in this example by ground command, is achieved without the 3 dB degradation of the single-to-noise ratio caused by summing the outputs of the receivers connected to antennas 1 and 2 as in alternative conventional prior configurations using a single multiplexer. It should be noted that uplink signals from ground stations 62 and 72 in any given channel may or may not be present. The invention described avoids the possible co-channel interference caused by summing the outputs of receivers 3 and 4 when signals from both ground stations 62 and 72 are present in a given channel.

BACKGROUND ART

A prior art search was conducted and uncovered the following U.S. patent references: U.S. Pat. Nos. 3,273,064, 3,636,452, 3,865,990, 4,109,202, 4,159,454, 4,161,694, and 4,206,464. All of the circulators shown in the above patents are unidirectional. On the other hand, the present invention uses field reversible circulators 51 to channelize signals from two antennas 1, 2.

FIG. 2 shows one approach proposed by prior artisans for solving the space diversity problem. Antennas 1 and 2 are pointing in different directions. Receivers 3 and 4 receive the electromagnetic energy emanating from antennas 1 and 2, respectively, and pass said energy through multiplexers 5 and 6, respectively. For each channel the output of multiplexer 5 or 6 is then selected by means of a switch 31 so the signals in the N channels from the N selected ground stations (of a possible 2N) can be processed by N high power amplifiers 32.

Multiplexer 5 comprises N unidirectional circulators 11. N filters 13 are coupled to the N circulators 11, respectively, and channelize the energy therefrom into N channels 12, which are isolated by means of N isolators 14.

Similarly, multiplexer 6 comprises N unidirectional circulators 21. N filters 23 are coupled to the N circulaors 21, respectively, and channelize the energy therefrom into N channels 22, which are isolated by means of N isolators 24.

The problem with this prior art approach is that it uses a lot of excess hardware, i.e., switches 31 and an entire second set of multiplexer 6 components: circulators 21, filters 23, and isolators 24.

A second approach proposed by prior artisans is illustrated in FIG. 3. In this approach, energy is received by the two antennas 1, 2, processed by the two receivers 3, 4, and combined by means of a 3 dB coupler 9. A single output multiplexer 8 is then used to channelize the energy into N channels 42. This is done by means of N unidirectional circulators 41 and N filters 43 coupled thereto, respectively.

The problem with this prior art approach is that the signal-to-noise ratio is degraded, by 3 dB, because noise from each receiver 3, 4 is processed along with the signal. A second problem with this approach is that, for each channel 42, the station communicating to one of the antennas 1, 2 must be relied upon to be silent when the other antenna 2, 1 is receiving information for that channel 42. This is not always possible or feasible.

The instant invention remedies the above problems by means of channelizing signals from two antennas 1, 2 using just a single multiplexer 7, without significantly degrading the signal-to-noise ratio.

DISCLOSURE OF INVENTION

The present invention is a reconfigurable multiplexeer (7) comprising N field reversible circulators (51), one for each of the N channels (52) into which the frequency bandwidth of incoming electromagnetic energy is segregated. N can be any positive integer. The circulators (51) are typically three-port ferrite circulators series-connected into a string. One end of the string is coupled to the first antenna (1) via a first receiver (3) and a first input isolator (43). Similarly, the second end of the string is coupled to the second antenna (2) via a second receiver (4) and a second input isolator (44).

Coupled to one port of each of the circulators (51) is a channelizing filter (53). The output of each channelizing filter (53) passes through an output isolator (54) and a high power amplifier (HPA) (55).

The direction of rotation of electromagnetic energy within each circulator (51) is selectively chosen so that selected ones of the N channels (52) are assigned to the first antenna (1), while the remaining channels (52) are assigned to the second antenna (2).

The invention has applicability in space diversity and polarization reuse communications systems, such as those used in conjunction with communications satellites. The multiplexer (7) can be dynamically reconfigured based upon the instantaneous systems requirements.

BRIEF DESCRIPTION OF THE DRAWINGS

These and other more detailed and specific objects and features of the present invention are more fully disclosed in the following specification, reference being had to the accompanying drawings, in which.

BEST MODE FOR CARRYING OUT THE INVENTION

Figure 1:
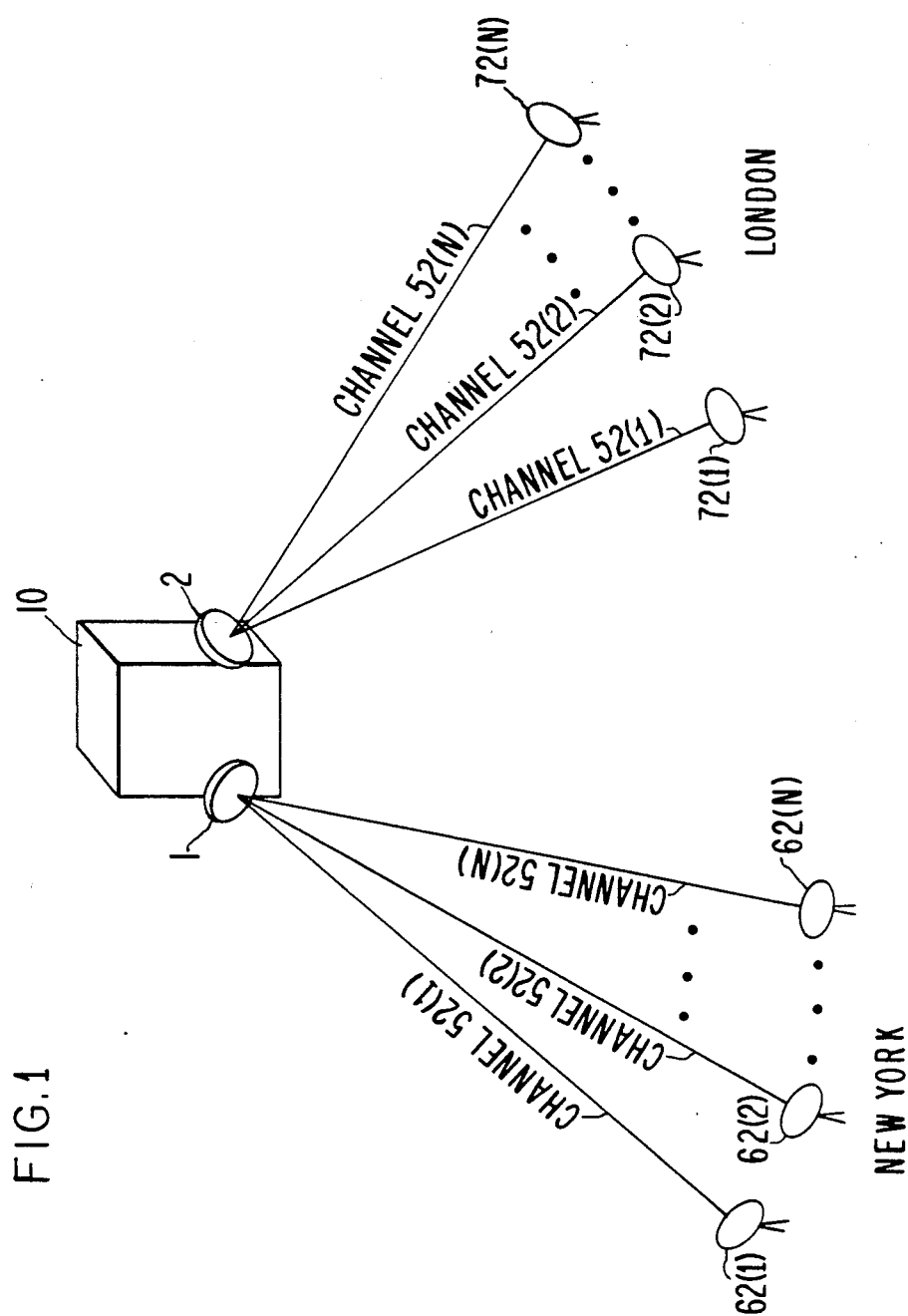
FIG. 1 is a sketch of a space diversity satellite communications system in which the present invention can be advantageously utilized.
Figure 2:
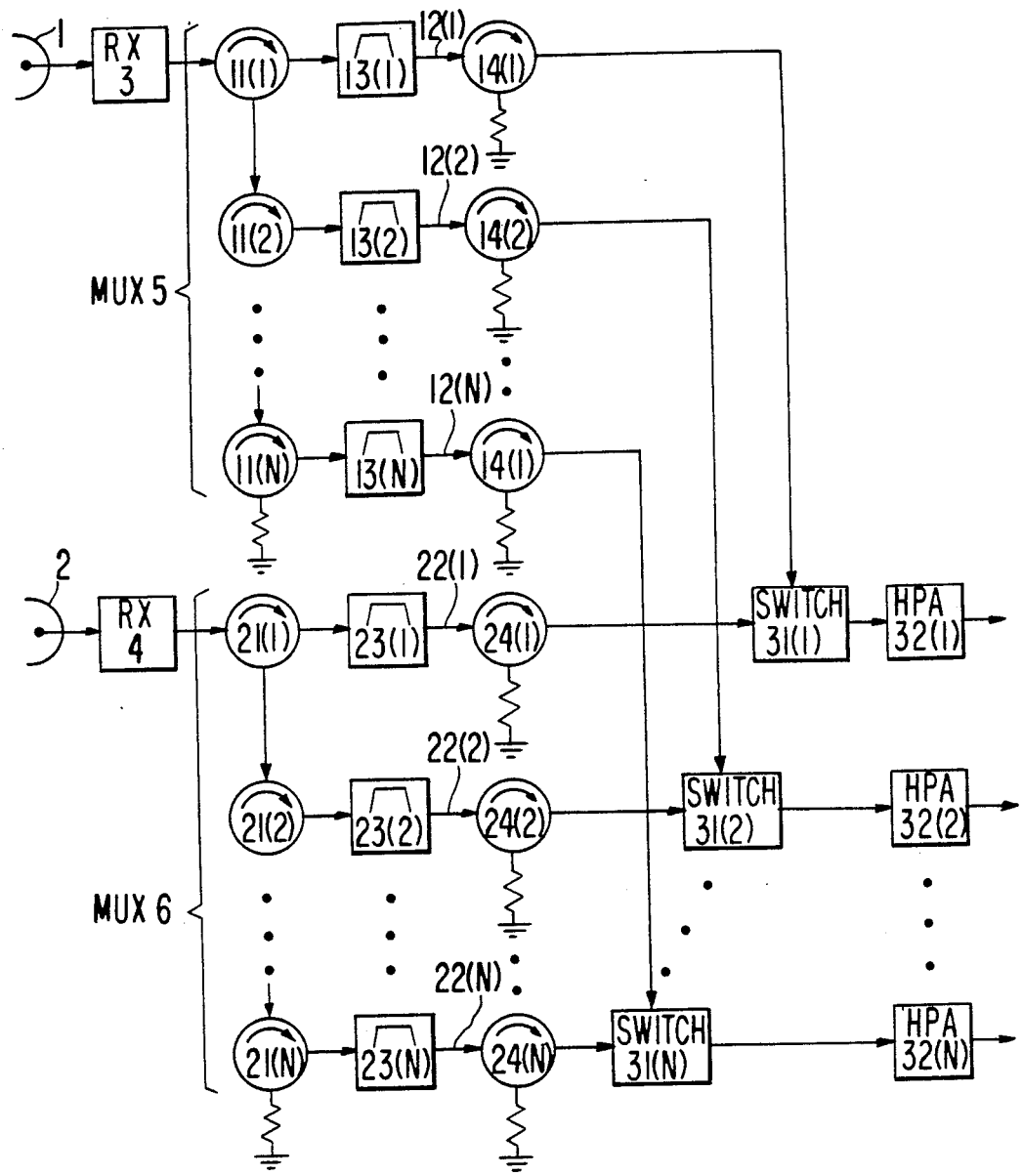
FIG. 2 is a block diagram of a method proposed by a first group of prior artisans to address the problem solved by the present invention.
Figure 3:
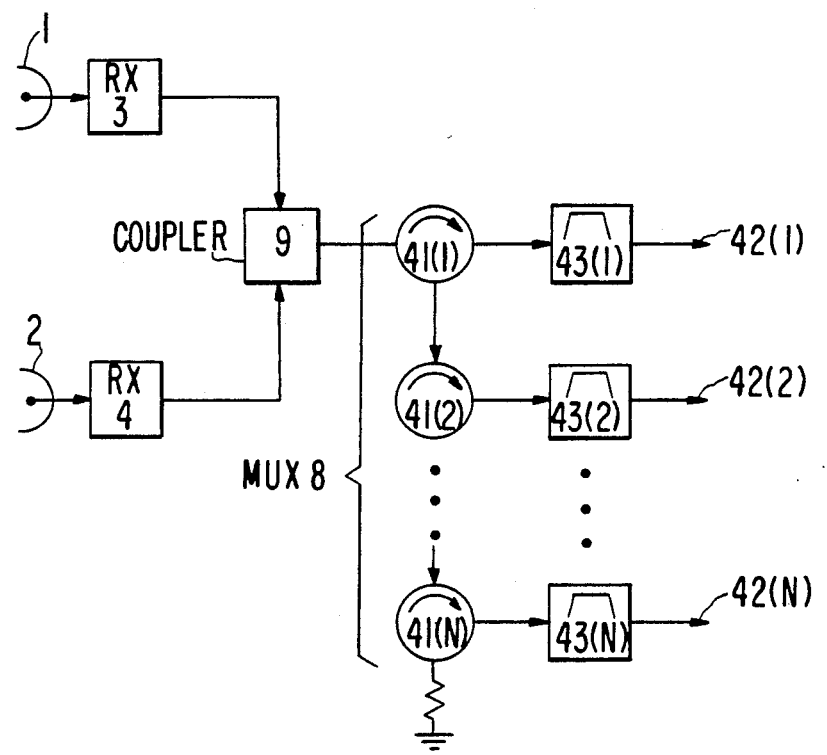
FIG. 3 is a block diagram of a method proposed by a second group of prior artisans to address the problem solved by the present invention.

The invention is typically used at UHF and higher frequencies, i.e., frequencies greater than or equal to 300 MHz. The invention may be used in a communications satellite or as part of a terrestrial microwave communications system. In a space diversity application, antennas 1 and 2 are pointing in different directions. In a polarization reuse application, antennas 1 and 2 are pointing in the same direction, but the polarizations of electromagnetic energy focused thereon are mutually orthogonal, e.g., LHCP and RHCP, or horizontal and vertical linear polarization, respectively. Note that in FIG. 4, the signals from antenna 1 are shown by solid lines, and the signals from antenna 2 are shown in dashed lines.

Each receiver 3, 4 typically comprises an amplifier and a down-converter. Subsequent to reception, the electromagnetic energy travels through a coax or waveguide medium.

Each input isolator 43, 44 is a circulator having one of its three ports terminated in a load resistor 45, 46, respectively. Each load resistor 45, 46 has an impedance equal to the characteristic impedance of the transmission line medium (typically 50 ohms).

Isolator 43 serves to absorb excess signals that emanate from antenna 2. As used herein, "excess signals" means signals which are either out of the frequency band to which multiplexer 7 is responsive, or signals which are within the band but not passed through any given channel 52 because access to that channel via antenna 1 has already been selected. In either event, such signals are absorbed by load resistor 45. Similarly, input isolator 44 absorbs signals from antenna 1 that are either out of the band of multiplexer 7 or else within a channel 52 for which access via antenna 2 has been selected.

The signals entering antenna 1 and antenna 2 can simultaneously contain frequency component spread across the entire bandwidth of multiplexer 7. Filters 53 are designed to divide this bandwidth into a set of N channels 52, which are typically contiguous, of equal bandwidth, and exhaustive of the overall bandwidth. An isolator 54 is inserted in each channel 52, to buffer the multiplexer 7 from downline RF components and to prevent mismatch interference. Each isolator 54 is a three port circulator, one of whose ports is loaded by a resistor 56 having an impedance equal to the characteristic impedance.

An optional group delay equalizer (not illustrated) may be inserted in each channel 52 to equalize the rate of change of phase versus frequency across the frequency band allocated to that channel. Similarly, an optional up-converter (not illustrated) may be inserted in each channel 52 if required for the particular application.

Each circulator 51 is a field reversible three-port ferrite device. The direction of rotation of electromagnetic energy within each circulator 51 is switchable.

Figure 4:
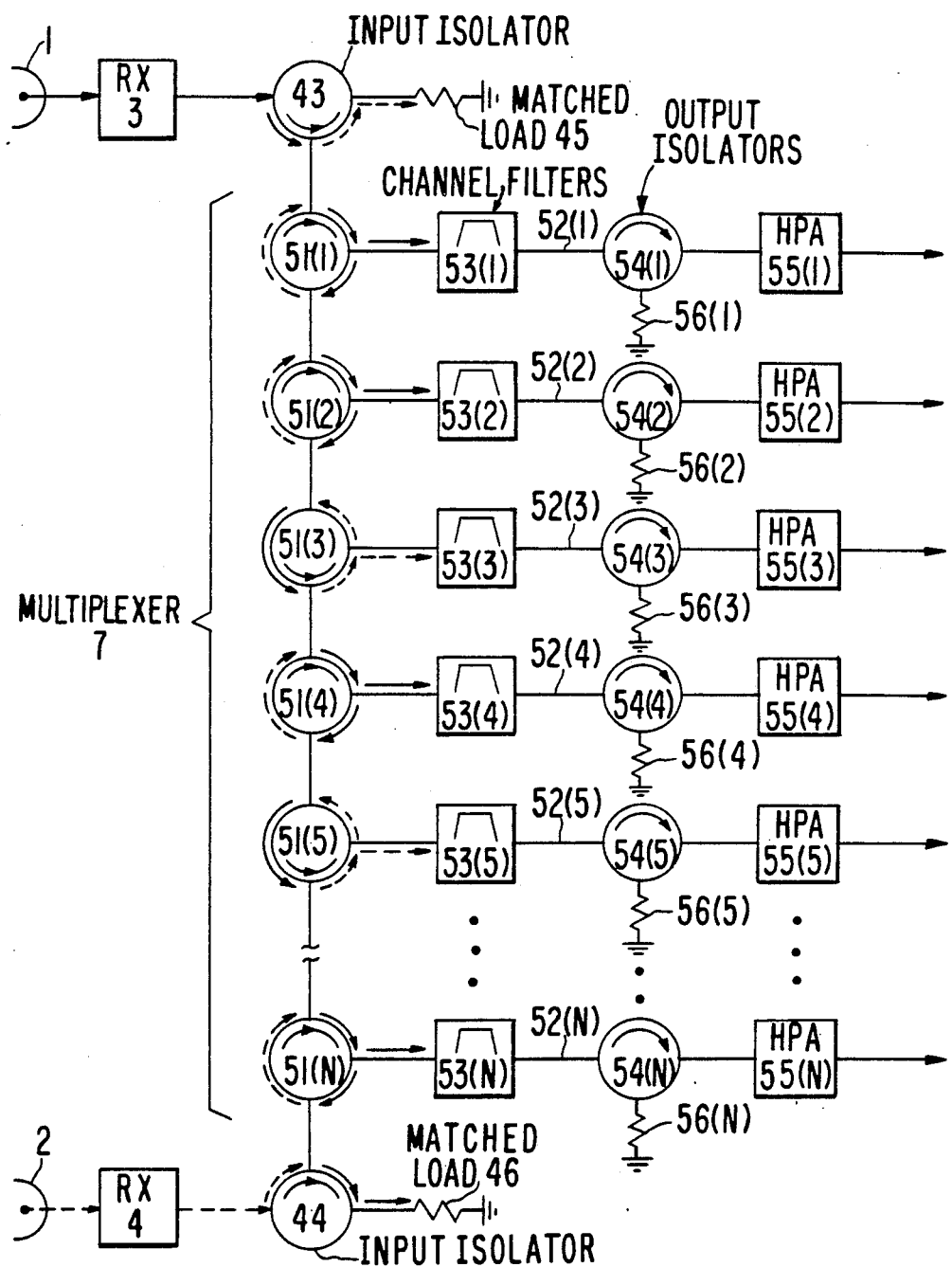
FIG. 4 is a block diagram of a preferred embodiment of the present invention.

FIG. 4 illustrates the case where circulators 51(3) and 51(5) have been commanded to provide counter-clockwise rotation; this permits signals from antenna 2, but not from antenna 1, to be fed to corresponding filters 53(3) and 53(5). All of the other circulators 51 are commanded to provide clockwise rotation; this permits corresponding filters 53(1), 53(2), 53(4), and 53(N) to receive signals from antenna 1 but not from antenna 2. The direction of rotation is selected by means of a ferrite switch associated with each circulator 51; an electrical current is made to reverse direction within a coil wrapped around a ferrite element in order to change the direction of rotation of the energy within the circulator 51.

Each filter 53 is capable of channelizing the appropriate frequency channel 52 because the impedance of the input port of said filter 53 (which is coupled to the non-series-connected port of the corresponding circulator 51) is at the characteristic impedance for said frequency channel 52, but is at a much higher or much lower impedance for all other frequencies. For example, consider the energy which emanated from antenna 2 and is passing from circulator 51(4) up to circulator 51(3). This energy may contain signals throughout the frequency range of the multiplexer 7 bandwidth (except for those frequencies within channel 52(5), which have already been siphoned off). However, only those frequencies that are within the channel 52(3) are passed by the filter 53(3). The remaining frequencies are reflected from the input port of filter 53(3) and continue their travel upwards into circulator 51(2).

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the invention.

What is claimed is:

1. A reconfigurable multiplexer comprising a string of N series-connected field reversible circulators, where N is a positive integer; wherein
    a first end of the string is coupled to a first source of electromagnetic energy, and a second end of the string is coupled to a second source of electromagnetic energy;
    coupled to each circulator is a channelizing filter, wherein the N channelizing filters divide the electromagnetic energy from the two sources into a set of N frequency channels; and
    the direction of rotation of electromagnetic energy within each circulator is selectively chosen so that selected ones of the N channels are assigned to the first source while selected others of the N channels are assigned to the second source.

2. The multiplexer of claim 1 wherein each source comprises an antenna; and the two antennas point in different directions.

3. The multiplexer of claim 1 wherein each source comprises an antenna; wherein the two antennas point in substantially the same direction and are disposed to receive electromagnetic signals that have mutually orthogonal polarizations.

4. The multiplexer of claim 1 wherein each source comprises an antenna, a receiver, and an isolator; wherein the isolator absorbs extraneous signals emanating from the opposing source.

5. The multiplexer of claim 1 wherein each circulator is a three-port device; and the direction of circulation of electromagnetic energy from port-to-port within the device is controlled by means of a ferrite switch.

6. The multiplexer of claim 1 situated on board a communications satellite.

7. The multiplexer of claim 1 wherein each channel comprises a channelizing filter, an output isolator, and a high power amplifier.

8. The multiplexer of claim 1 wherein each filter has an input port at which the impedance is substantially equal to the characteristic impedance of the transmission medium that couples the circulators together, within the bandwidth of the channel associated with that filter.

* * * * *